US00RE36004E

United States Patent [19]

Hinnefeld et al.

[11] E Patent Number: Re. 36,004

[45] Reissued Date of Patent: Dec. 22, 1998

[54] INCLINED CEILING DOWNLIGHT FIXTURES

[75] Inventors: Jon D. Hinnefeld, Greencastle; Mark E. Jennings, Crawfordsville; Michael D. Wallace, Greencastle, all of Ind.

[73] Assignee: NSI Enterprises, Inc., Atlanta, Ga.

[21] Appl. No.: 642,309

[22] Filed: May 3, 1996

Related U.S. Patent Documents

Reissue of:

[64] Patent No.: 5,452,193
Issued: Sep. 19, 1995
Appl. No.: 117,227
Filed: Sep. 3, 1993

[51] Int. Cl.[6] ..... F21V 17/00

[52] U.S. Cl. ..... 362/366; 362/148; 362/287; 362/365

[58] Field of Search ..... 362/366, 287, 362/365, 148, 364, 418, 427, 285, 147, 429

[56] References Cited

U.S. PATENT DOCUMENTS

| | | | |
|---|---|---|---|
| 2,859,333 | 11/1958 | Burlick | 362/364 |
| 3,219,812 | 11/1965 | Turner | 362/285 |
| 3,313,931 | 4/1967 | Klugman | 362/366 |
| 3,643,086 | 2/1972 | Shaw | 362/364 |
| 3,683,173 | 8/1972 | Guth, Jr. | 362/366 |
| 3,872,296 | 3/1975 | Cohen et al. | 362/366 |
| 4,336,575 | 6/1982 | Gilman | 362/364 |
| 4,729,080 | 3/1988 | Fremont et al. | 362/366 |
| 4,809,468 | 3/1989 | Bareiss | 362/365 |
| 5,124,901 | 6/1992 | Sojka et al. | 362/366 |

OTHER PUBLICATIONS

Lithonia Lighting Brochure, Austin White, Jun. 7, 1993.

*Primary Examiner*—Thomas M. Sember
*Attorney, Agent, or Firm*—Kenneth E. Darnell

[57] ABSTRACT

Lighting fixtures which may be employed in inclined ceiling applications. The fixtures feature substantially elliptical cross-sectioned housings which, when intersected by the plane of an inclined ceiling, yield a circular opening and trim in order to lend an aesthetically pleasing appearance. Such fixtures may also employ adjustable socket housings in order to allow the lamp contained within the fixture to be disposed substantially perpendicular to the floor space, or as otherwise desired, to impart a desired lighting pattern.

31 Claims, 3 Drawing Sheets

INCLINED CEILING DOWNLIGHT FIXTURES

Matter enclosed in heavy brackets [ ] appears in the original patent but forms no part of this reissue specification; matter printed in italics indicates the additions made by reissue.

This invention relates to recessed downlight fixtures which are adapted to be used in inclined ceilings. The housings of such fixtures feature an elliptical cross section which, when intersected by the gradient of such a ceiling, provides a circular opening in the ceiling. Such fixtures also allow the orientation of the lamp to be conveniently adjusted relative to the inclined ceiling in order to cast lighting patterns as desired.

BACKGROUND OF THE INVENTION

Architects and interior designers consider lighting to be a critical element of the aesthetic appeal of interior spaces they design. Recessed ceiling lighting fixtures are often an important ingredient in lending such appeal. Clean exterior appearances and precise control over intensity and lighting pattern are crucial elements in good design practices.

A common characteristic of downlight fixtures, whether or not for inclined ceilings, is that the lamp is preferably positioned substantially perpendicular to the floor space in order to impart a uniform lighting pattern. Accordingly, the can or housing of conventional downlight fixtures is constructed to be mounted substantially perpendicular to the floor space, regardless of the angle at which the ceiling is inclined. Consequently, conventional inclined ceiling downlight fixtures (as do downlight fixtures for non-inclined ceilings) employ a circular can or housing which, when intersected by the plane of the inclined ceiling, provides an elliptical opening in the ceiling. Such fixtures are disclosed in U.S. Pat No. 5,124,901 to Sojka, et al., U.S. Pat. No. 4,729,080 to Fremont, et al., and U.S. Pat. No. 2,859,333 to Burliuk, et al.

Such designs also often aim to accommodate a range of ceiling gradients in order to ensure that the lamp is disposed substantially perpendicular to the floor space. The Sojka patent, for instance, discloses a circular can or housing that is adapted to pivot perpendicular to the gradient of an inclined ceiling. This housing surrounds a circular baffle which may be cut at the appropriate angle corresponding to a given gradient. The Fremont patent discloses a circular fixture housing that is cut at an oblique angle to its longitudinal axis corresponding to a particular ceiling gradient, again to provide an elliptical ceiling opening. The Burliuk patent discloses a fixture housing of circular cross-section that is cut at an angle oblique to its longitudinal axis in order to allow a designer to position the lamp at various angles. A flat circular plate to which the lamp may be attached covers the top of the housing so that the angle at which the lamp is disposed may be varied by rotating the plate relative to the housing.

SUMMARY OF THE INVENTION

Fixtures according to the present invention, unlike conventional approaches, employ fixture housings which are substantially elliptical in cross-section perpendicular to their longitudinal axis. Such housings, when intersected by the plane of an inclined ceiling, form a circle (the locus of points on the ellipse intersected by the ceiling plane) so that the opening in the ceiling, and thus the fixture trim and exterior appearance, is circular in shape rather than elliptical.

Such housings may also feature an elliptically hemispherical domed top to which may be attached a sliding plate which carries the lamp socket. Consequently, the lamp angle may be adjusted by sliding the plate on the dome to accommodate the particular ceiling gradient. This adjustment may be conveniently accomplished from below the fixture after it is installed, without intrusion into the ceiling, by sliding the plate and setting a fixation screw which may extend into the housing. Accordingly, downright fixtures of the present invention provide a circular, and therefore aesthetically pleasing, opening in an inclined ceiling, while at the same time allowing the lamp to be adjusted substantially vertical to the floor space in order to cast the desired lighting pattern.

It is therefore an object of the present invention to provide inclined ceiling lighting fixtures which present aesthetically pleasing circular ceiling openings and trim, for a range of ceiling gradients, while casting a desired lighting pattern.

It is another object of the present invention to provide inclined ceiling lighting fixtures which may be manufactured efficiently and which feature the durability of a one piece fixture housing design while increasing the range of ceiling gradients for which the lamp may be positioned vertically.

It is a further object of the present invention to provide an easily installed downlighting fixture which may accommodate a range of ceiling gradients, provide aesthetically pleasing trim, and cast desired lighting patterns.

Other objects, features and advantages of the present invention will become apparent with reference to the remainder of this document.

DETAILED DESCRIPTION OF THE DRAWINGS

References to orientation and components such as "upper," "lower," "top," and "bottom" are made relative to vertical and such fixtures as installed in ceilings, and are for the convenience of the reader in understanding the disclosure rather than to limit the scope of the present invention.

Figure 1:
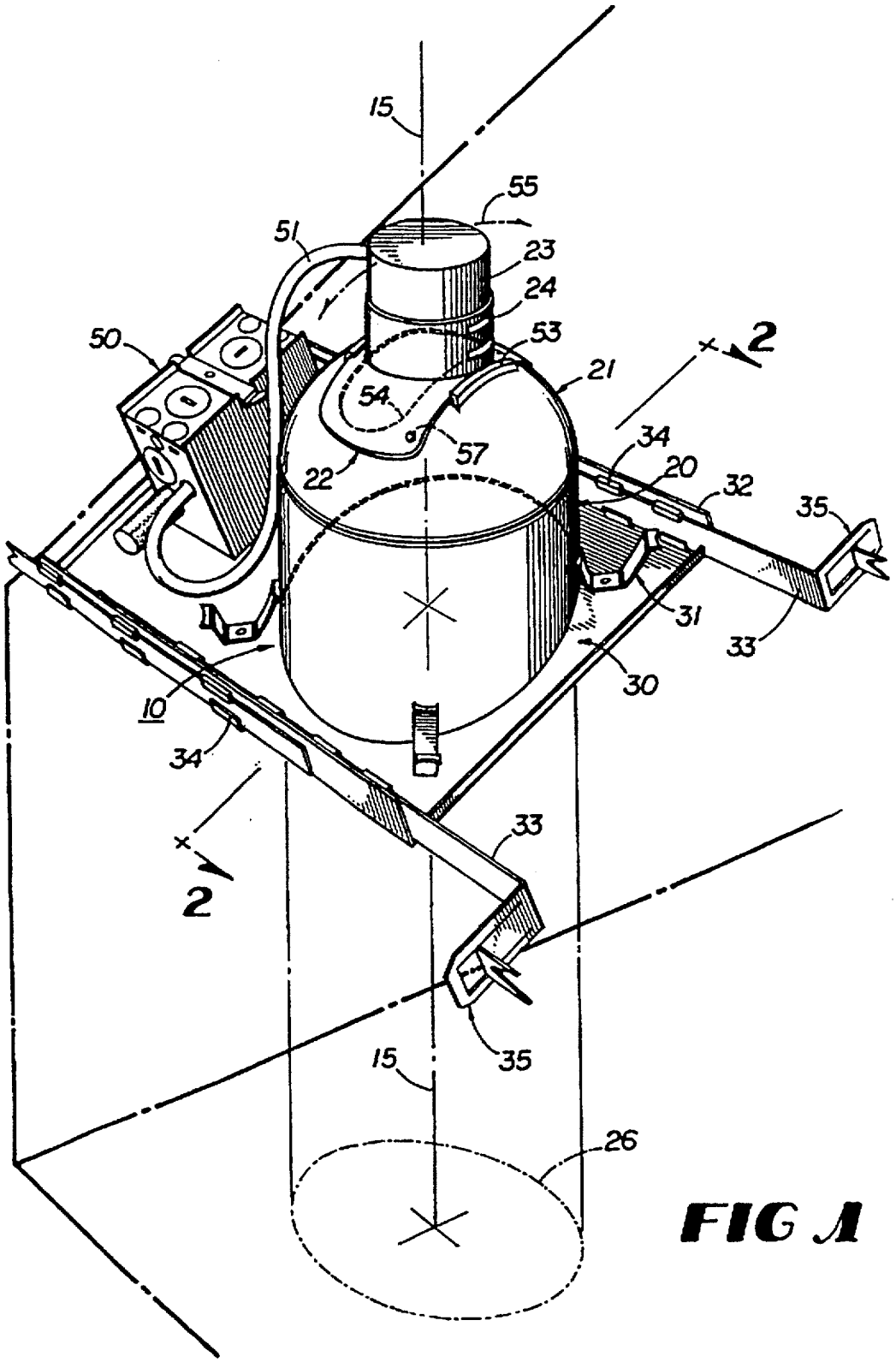
FIG. 1 is a perspective view of a first embodiment of the downlight fixture according to the present invention.

FIG. 1 shows a downlight fixture 10 according to the present invention adapted for inclined ceilings and comprising, among other components, a generally tubular fixture housing 20 that includes an upper end and a lower end, a dome 21 connected to the upper end of fixture housing 20, a sliding plate 22 connected in sliding fashion to the dome, and a socket housing 23 connected to the sliding plate 22. The socket housing 23 accommodates a socket 25 that may be of conventional design and that in turn receives a conventional lamp 18 (see FIG. 2).

The fixture housing shown in FIG. 1 features a cross-section 26 perpendicular to the housing's longitudinal axis 15 that is substantially elliptical. The upper end of housing 20 is generally elliptical and disposed in a plane that is substantially perpendicular to the longitudinal axis 15, while the lower end of housing 20 is substantially circular and located in a plane that is oblique to the longitudinal axis 15.

Housing 20 may be formed of appropriate plastic or metallic material and, in the preferred embodiment, is conventionally formed sheet metal of the type often employed in downlighting fixtures.

Dome 21 is preferably formed as part of the upper end of housing 20 by hydroforming or as otherwise desired. It may also be welded or otherwise attached. Dome 21 features a lower edge that is substantially elliptical to conform to the upper end of housing 20. Dome 21 may be formed of stamped metal, of plastic or as otherwise desired, and in the preferred embodiment is formed of stamped metal.

Figure 4:
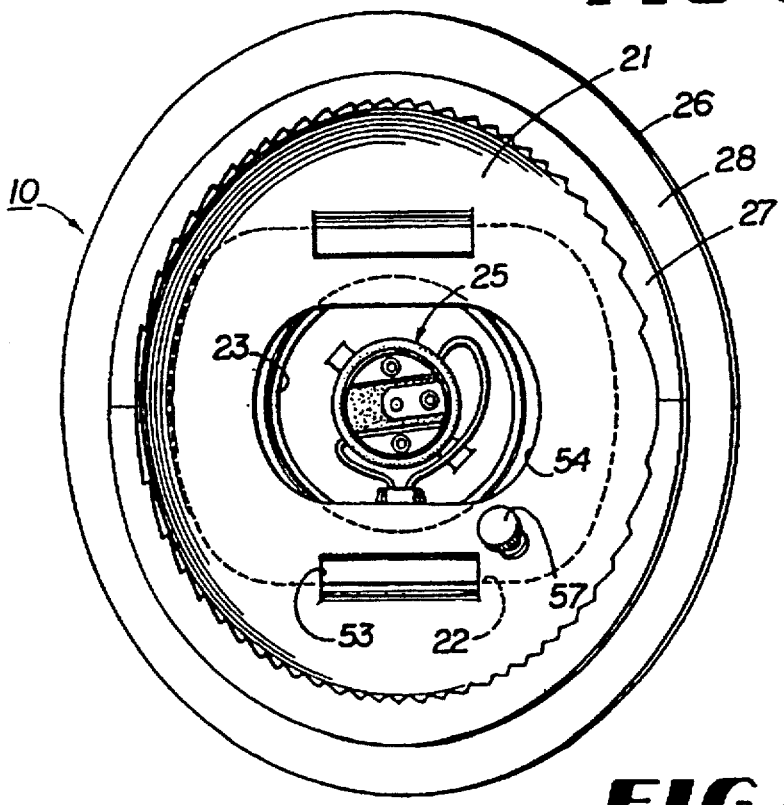
FIG. 4 is a bottom view of the fixture of FIG. 2 in the plane denoted by line 4—4 of FIG. 2.

Attached to the upper surface of dome 21 in sliding fashion is a sliding plate 22 which conforms generally to the curve of dome 21. A socket housing 23, preferably of generally cylindrical shape, is attached to sliding plate 22 (preferably but not necessarily to its upper surface), so that the sliding assembly on dome 21 may be adjusted in sliding fashion substantially in the direction of the ceiling gradient to cause a lamp within socket 23 to be oriented substantially perpendicular to the floor space below the fixture 10 or as otherwise desired. The sliding plate 22 and socket housing 23 assembly accordingly slides on the top of the dome 21 in the direction of the minor axis of the elliptical cross-section 26 of housing 20. A set screw 57 that penetrates sliding plate 22 to impinge on dome 21, or any other appropriate fastener or fixing device, may be used to secure sliding plate 22 and thus socket housing 23 in position. Set screw 57 may alternatively, as shown in FIG. 4, be mounted via threads in the dome 21 to impinge against sliding plate 22 so that sliding plate 22 (and thus the lamp) may be adjusted as desired from within the lighted space to cast a desired pattern within that space.

Figure 2:
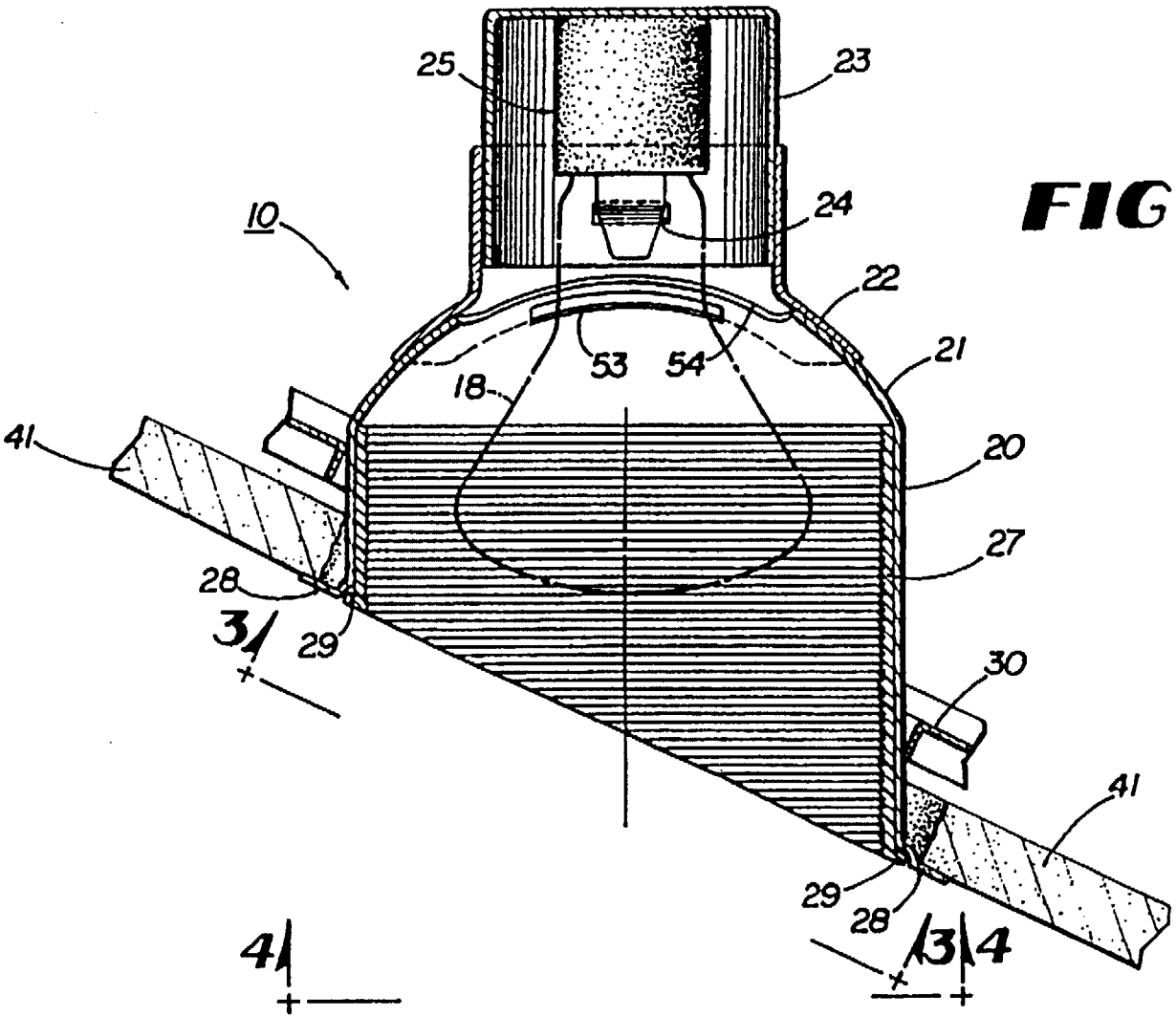
FIG. 2 is a side cross-sectional view of the fixture of FIG. 1.

FIG. 2 shows more clearly one means for connecting sliding plate 22 to dome 21 in the form of two or more tabs 53 which receive a portion of sliding plate 22. Sliding plate 22 and socket housing 23 may be formed of stamped metal or as otherwise desired, and housing 23 preferably contains slots 24 or other means for adjustment of socket 25 or for other purposes as desired.

Housing 20 of fixture 10 is preferably attached to a ceiling plate 30 which features an opening 31 that registers with the lower end of housing 20. Plate 30 may be attached as desired to housing 20; FIG. 1 shows plate 30 and housing 20 attached via a plurality of mounting clips 31. Ceiling plate 30 may support junction box 50 which powers lamp socket 25 disposed in housing 23 through electrical conduit 51.

The ceiling plate 30 preferably includes adjustable means for accommodating a variety of ceiling structures. FIG. 1 shows plate 30 featuring two ceiling plate flanges 32, each of which includes a number of mounting tabs 34 which receive mounting bars 33. Mounting bars 33 consequently slide relative to ceiling plate 30 in order to accommodate various ceiling structures. Mounting bars 33 may be connected as otherwise desired to plate 30.

Also shown more clearly in FIG. 2 is baffle 27 which conforms generally to the shape of housing 20, fits within its interior and preferably includes a corrugated interior surface for diffusing light. Baffle 27 may be formed of plastic materials or as otherwise desired, or, if desired, the corrugations may be formed directly in housing 20 to diffuse light rather than including a separate baffle assembly 27. FIG. 2 also shows a flange 28 which may form a portion of, or be connected to, housing 20 in order to form trim on the ceiling 41 surface. A separate trim ring (not shown) may alternatively be used in conventional fashion if desired.

Figure 3:
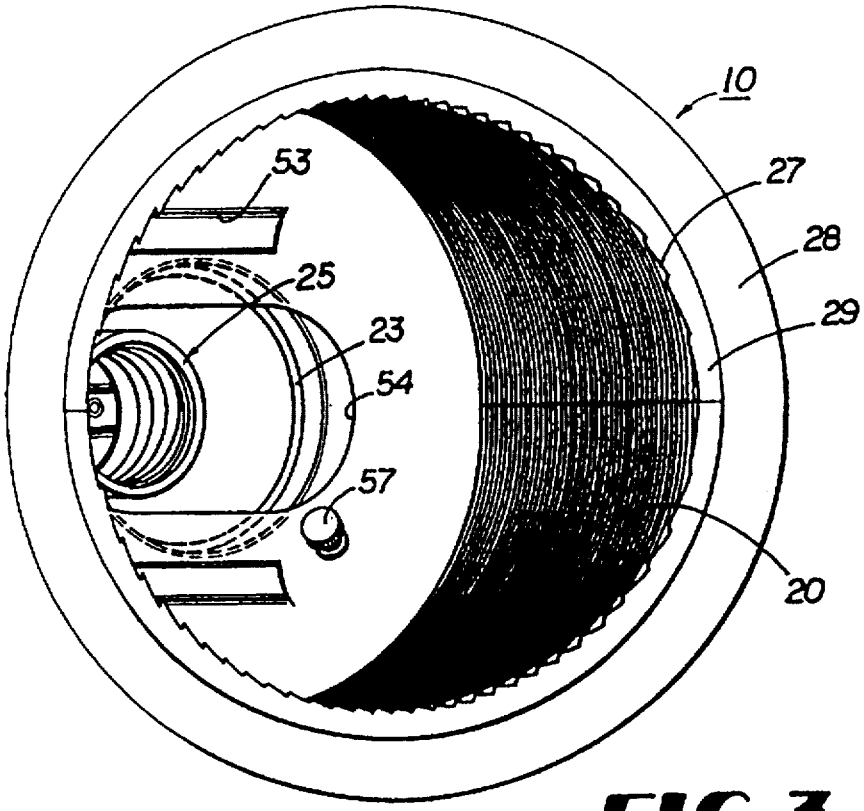
FIG. 3 is a partially schematic bottom view of the fixture of FIG. 2 in the plane denoted by line 3—3 of FIG. 2.

FIG. 3 shows, partially schematically, the appearance of the fixture of FIG. 1 when viewed looking directly into the plane of the ceiling, as shown by line 3—3 of FIG. 2. The trim 28 features a generally circular shape, as does the bottom surface of baffle 27.

FIG. 4 shows the appearance of FIG. 1 when viewed looking vertically upward. The interior of dome 21 is shown more clearly in FIG. 4, and the opening 54 in dome 21 formed to accommodate a lamp placed within socket 25 within socket housing 23 is shown. Opening 54 may be of any desired shape to accommodate a range of lamp positions. Just as easily, however, fixture 10 need not include any means for adjustably positioning the lamp relative to the housing 20.

The foregoing is provided for purposes of description rather than limitation, and modifications may be made to fixtures and components described in the foregoing and the remainder of this document without departing from the scope or spirit of the invention.

What is claimed is:

1. A downlight fixture for an inclined ceiling, comprising:

a. a housing which includes an upper end, a lower end and a longitudinal axis, which housing is substantially elliptical in cross section normal to its longitudinal axis, and whose lower end forms an opening that is substantially circular in a plane that is oblique to the housing longitudinal axis;

b. a lamp socket connected to the upper end of the housing for accommodating a lamp; and c. a ceiling plate attached to the lower end of the housing, which plate contains a substantially circular opening in registration with the substantially circular opening formed by the lower end or the housing.

2. A fixture according to claim 1 further comprising a plurality of mounting bars connected to the ceiling plate in adjustable fashion for attaching the ceiling plate to a ceiling structure.

3. A fixture according to claim 1 further comprising a baffle contained in the housing, which baffle conforms generally in shape to the housing, has an upper end and a lower end corresponding generally to the upper and lower ends of the housing, is open at both ends, and is adapted to receive, in its upper end, a lamp placed in the socket.

4. A fixture according to claim 1 in which at least a part of the baffle is corrugated for diffusing light.

5. A fixture according to claim 1 in which the lower end of the housing forms a substantially circular flange which is adapted to form a trim ring on the ceiling.

6. A fixture according to claim 1 in which a separate, substantially circular, trim ring Is attached to the lower end of the fixture in order to trim the fixture on the ceiling.

7. A fixture according to claim 1 further comprising structure for adjustably connecting the socket to the housing, which structure includes a dome connected to the upper end of the housing, a sliding plate connected in sliding fashion to the dome, and a socket housing connected to the sliding plate and to which the socket is connected.

8. A downlight fixture for an inclined ceiling, comprising:

a. a housing which includes an upper end, a lower end and a longitudinal axis, which housing is substantially elliptical in cross section normal to its longitudinal axis, and whose lower end forms an opening that is substantially circular in a plane that is oblique to the housing longitudinal axis;

b. a dome connected to the upper end of the housing, which dome contains an opening and features a substantially elliptical lower portion that connects to the housing;

c. a sliding plate connected in sliding fashion to the dome; and d. a socket connected to the sliding plate for accommodating a lamp so that the lamp may protrude through the opening in the dome substantially vertically to a floor below the ceiling.

9. A fixture according to claim 8 further comprising a ceiling plate attached to the lower end of the housing, which plate contains a substantially circular opening in registration with the substantially circular opening formed by the lower end of the housing.

10. A fixture according to claim 8 in which the fixture is adapted to accommodate ceilings that have various pitches.

11. A fixture according to claim 8 in which the lower end of the housing forms a substantially circular flange which is adapted to form a trim ring on the ceiling.

12. A fixture according to claim 9 in which the ceiling plate further comprises a number of mounting bars connected to the ceiling plate in adjustable fashion for attaching the ceiling plate to structure that forms the ceiling.

13. A downlight fixture for accommodating a lamp in an pitched ceiling, comprising:

a. a generally tubular housing which includes an upper end, a lower end forming an opening, and a longitudinal axis, which housing is adapted to be disposed in the ceiling so that its longitudinal axis is substantially perpendicular to a floor below the ceiling;

b. a dome connected to the upper end of the housing, which dome contains an outer surface on a convex side of the dome, an inner surface on a concave side of the dome, an oblong opening oriented in the direction of the pitch of the ceiling and penetrating the outer and inner surfaces of the dome, and at least two tabs which are substantially L shaped in cross section protruding from the outer surface of the dome;

c. an oblong sliding plate which conforms in shape generally to the outer surface of the dome, and whose edges are adapted to be captured by the tabs protruding from the outer surface of the dome so that the sliding plate is captured in sliding fashion by the tabs in a fashion to cover at least a portion of the opening in the dome, and which sliding plate features a lamp opening through which at least a portion of the lamp may protrude;

d. a generally cylindrical socket housing extending from the sliding plate in a direction generally away from the dome; and e. a socket contained in the socket housing for accommodating the lamp so that the lamp may protrude through the lamp opening in the sliding plate and the oblong opening in the dome substantially vertically to a floor below the ceiling when the sliding plate is disposed correctly relative to the dome.

14. A fixture according to claim 13 further comprising a ceiling plate attached to the lower end of the housing, which plate contains an opening in registration with the opening formed by the lower end of the housing.

15. A fixture according to claim 13 in which the housing is substantially elliptical in cross section perpendicular to its longitudinal axis and the opening at the lower end is substantially circular in a plane oblique to the longitudinal axis.

16. A fixture according to claim 13 further comprising a set screw inserted in the dome to set the position of the sliding plate relative to the dome, the set screw featuring a head which protrudes from the inner surface of the dome to be accessible from below the ceiling.

17. A fixture according to claim 13 further comprising a baffle within the housing, at least part of which is corrugated to diffuse light.

18. A fixture according to claim 13 in which the housing further includes a flange attached to its lower end in order to form trim on the ceiling to which the fixture is attached.

*19. In a downlight fixture for installation in a sloped ceiling, the fixture having a housing which includes an upper end, a lower end and a longitudinal axis, the fixture carrying a lamp socket to which a lamp is operably joined to produce light which emanates from the fixture at least through the lower end of the housing, the improvement comprising a substantially elliptical cross-section formed in at least a portion of the housing between the upper end and the lower end, the elliptical section of the housing being normal to the longitudinal axis of the housing, the lower end of the housing forming an opening which is substantially circular in a plane oblique to the longitudinal axis of the housing.*

*20. In the downlight fixture of claim 19 wherein the ceiling has a circular opening formed therein and the lower end of the housing is disposed proximus to said circular opening formed in the ceiling, the substantially circular opening formed by the lower end of the housing being juxtaposed to the opening formed in the ceiling.*

*21. In the downlight fixture of claim 20 wherein the circular opening formed in the ceiling is substantially congruent with the circular opening formed by the lower end of the housing.*

*22. In the downlight fixture of claim 20 wherein the circular opening formed in the ceiling is in registration with the substantially circular opening formed by the lower end of the housing.*

*23. In the downlight fixture of claim 19 wherein the improvement further comprises a ceiling plate attached to the lower end of the housing, which plate is formed with a substantially circular opening in registration with the substantially circular opening formed by the lower end of the housing.*

*24. In the downlight fixture of claim 23 wherein the ceiling has a circular opening formed therein and the substantially circular opening formed in the ceiling plate is disposed proximus to the circular opening formed in the ceiling, the substantially circular opening formed in the ceiling plate being juxtaposed to the opening formed in the ceiling.*

*25. In the downlight fixture of claim 24 wherein the circular opening formed in the ceiling is substantially congruent with the circular opening formed in the ceiling plate.*

*26. In the downlight fixture of claim 24 wherein the circular opening formed in the ceiling is of a diameter slightly greater than the diameter of the circular opening formed in the ceiling plate.*

*27. In the downlight fixture of claim 24 wherein the lower end of the housing forms a substantially circular flange which is adapted to fit over the circular opening formed in the ceiling to trim said ceiling opening.*

*28. In the downlight fixture of claim 24 and further comprising a separate, substantially circular trim ring affixed to the lower end of the housing to trim the circular opening formed in the ceiling.*

*29. In the downlight fixture of claim 19 wherein the improvement further comprises means carried by the fixture for adjusting lamp socket position and thus lamp position.*

*30. In the downlight fixture of claim 19 wherein the improvement further comprises means carried by the fixture for adjustably connecting the lamp socket to the housing.*

*31. In the downlight fixture of claim 30 wherein the connecting means comprise:*

*a dome connected to the upper end of the housing;*

*a sliding plate;*

*means for connecting the sliding plate to the dome for relative sliding motion therebetween; and,*

*a socket housing connected to the sliding plate and to which socket housing the socket is connected.*

* * * * *